(12) United States Patent
Lehtinen et al.

(10) Patent No.: US 10,508,002 B2
(45) Date of Patent: Dec. 17, 2019

(54) ROPE LIFTING TOOL AND A ROPE LIFTING ARRANGEMENT

(71) Applicant: KONE Corporation, Helsinki (FI)

(72) Inventors: Hannu Lehtinen, Numminen (FI); Antti Koskinen, Järvenpää (FI); Pekka Hallikainen, Hyvinkää (FI); Toma Cornea, Hyvinkää (FI); Teemu Majasalmi, Läyliäinen (FI)

(73) Assignee: KONE CORPORATION, Helsinki (FI)

( * ) Notice: Subject to any disclaimer, the term of this patent is extended or adjusted under 35 U.S.C. 154(b) by 877 days.

(21) Appl. No.: 14/963,895

(22) Filed: Dec. 9, 2015

(65) Prior Publication Data

US 2016/0207741 A1    Jul. 21, 2016

(30) Foreign Application Priority Data

Jan. 21, 2015 (EP) ..................... 15151933

(51) Int. Cl.
*B66B 7/08* (2006.01)
*B66B 19/02* (2006.01)
*F16G 11/04* (2006.01)

(52) U.S. Cl.
CPC .............. *B66B 7/085* (2013.01); *B66B 19/02* (2013.01); *F16G 11/04* (2013.01)

(58) Field of Classification Search
CPC ........... B66B 7/08; B66B 7/085; B66B 19/02; B66B 7/062; F16G 11/04
See application file for complete search history.

(56) References Cited

U.S. PATENT DOCUMENTS

| 3,519,101 A * | 7/1970 | Sieffert | B66B 9/187 187/256 |
| 5,353,893 A | 10/1994 | Sun et al. | |
| 6,820,726 B1 * | 11/2004 | Ericson | B66B 7/085 187/411 |
| 8,505,173 B2 * | 8/2013 | Pitts | B66B 7/085 24/136 R |
| 2007/0170014 A1 * | 7/2007 | Woronoff | B66B 5/16 187/414 |

(Continued)

FOREIGN PATENT DOCUMENTS

| WO | WO 2009/090299 A1 | 7/2009 |
| WO | WO 2010/000330 A1 | 1/2010 |
| WO | WO 2014/118315 A1 | 8/2014 |

*Primary Examiner* — Sang K Kim
*Assistant Examiner* — Nathaniel L Adams
(74) *Attorney, Agent, or Firm* — Birch, Stewart, Kolasch & Birch, LLP

(57) ABSTRACT

A rope lifting tool for belt-shaped ropes comprises a first guide for guiding the rope lifting tool along a first guide rail; a second guide for guiding the rope lifting tool along a second guide rail; an upright plate, and an inclined plate at an acute angle relative to the upright plate. The upright plate and the inclined plate have a wedge shaped space between them. A plurality of wedge members are placed adjacent each other inside the wedge-shaped space. A rope gap for receiving an end of a belt-shaped rope is formed between each wedge member and the upright plate, which rope gap is narrowable by wedging of the wedge member in the wedge shaped space. A rope lifting arrangement includes the rope lifting tool.

18 Claims, 3 Drawing Sheets

(56) References Cited

U.S. PATENT DOCUMENTS

| | | | | |
|---|---|---|---|---|
| 2013/0160245 A1* | 6/2013 | Ferreira | ................ | F16G 11/10 24/135 A |
| 2013/0270042 A1* | 10/2013 | Henneau | ............... | B66B 5/0006 187/251 |
| 2014/0182975 A1* | 7/2014 | Ikonen | ................ | B66B 5/0031 187/251 |
| 2017/0107079 A1* | 4/2017 | Lehtinen | ................ | B66B 7/062 |
| 2017/0369282 A1* | 12/2017 | Ericson | ................ | B66B 7/085 |

* cited by examiner

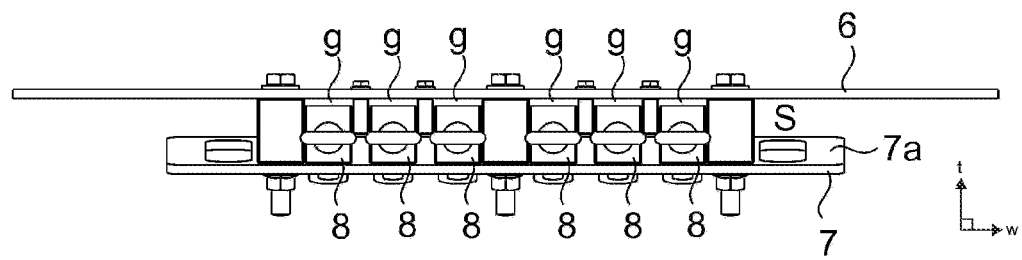
Fig. 3a
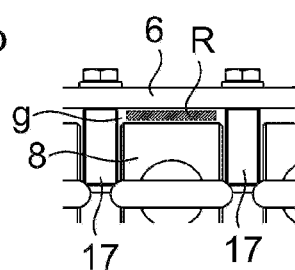
Fig. 3b
Fig. 4
Fig. 5
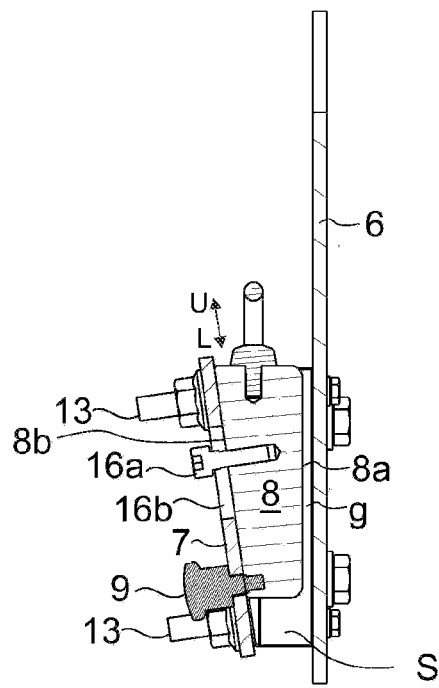
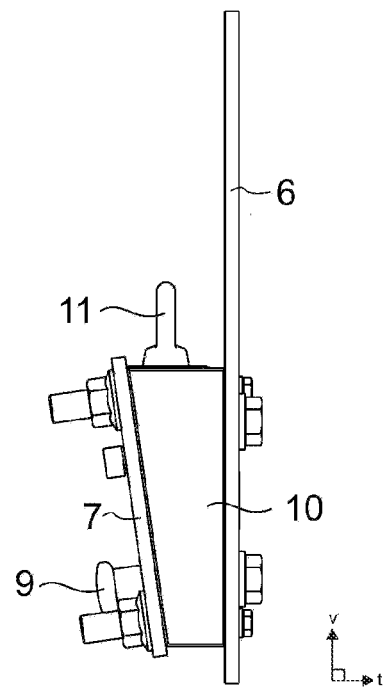

ROPE LIFTING TOOL AND A ROPE LIFTING ARRANGEMENT

FIELD OF THE INVENTION

The invention relates to lifting of ropes of an elevator in context of their installation.

BACKGROUND OF THE INVENTION

Elevators typically utilize several ropes connected to the car, such as suspension ropes arranged to suspend the car. These ropes are typically arranged to interconnect the car with a counterweight and to pass around one or more rope wheels mounted above the car and counterweight, typically in the upper end of the hoistway or in its proximity. When the elevator is being manufactured or when old ropes of an existing elevator need to be changed, new ropes are installed. During installation, the ropes are unreeled and guided to hang in the hoistway. The ropes can be unreeled from rope reels and guided further to pass their intended route in the hoistway, such as around the rope wheels mounted in the upper end of the hoistway or in its proximity. The guiding can be done by lowering the ropes from their reels positioned close to the upper end of the hoistway. Alternatively, the guiding can be done by lifting the ropes inside the hoistway from their reels positioned close to the upper end of the hoistway. In prior art, it has been possible to install metal wire ropes that have a round cross-section simply by unreeling them from reels positioned close to the lower end of the hoistway, and lifted up with a hoisting device engaging their ends. This is because this kind of ropes can be engaged firmly without damaging them. The drawback of the known installation methods and devices has been that they have not enabled installation of belt-like ropes by lifting with simple devices and without damaging the ropes.

BRIEF DESCRIPTION OF THE INVENTION

The object of the invention is to provide a solution alleviating problems occurring in lifting of elevator ropes during installation thereof. An object is to alleviate one or more of the above defined problems of prior art and/or problems discussed or implied elsewhere in the description. Particularly, an object is to provide an improved rope lifting tool, which is suitable for belt-shaped ropes, as well as an improved arrangement for lifting belt-shaped ropes. An object is particularly to provide a rope lifting tool and arrangement, which enable engagement to several belt-shaped ropes reliably without damaging them, as well as efficient and well controlled lifting of the ropes inside the hoistway on an elevator under modification or construction. It is brought forward such embodiments, inter alia, which can be used also with ropes which are so fragile or rigid that they cannot be sharply bent. It is also brought forward such embodiments, inter alia, which are easily usable.

It is brought forward a new rope lifting tool for belt-shaped ropes comprising a first guide for guiding the rope lifting tool along a first guide rail; a second guide for guiding the rope lifting tool along a second guide rail; an upright plate and an inclined plate at an acute angle relative to the upright plate. The upright plate and the inclined plate have a wedge shaped space between them, and the rope lifting tool further comprises a plurality of wedge members placed adjacent each other inside the wedge-shaped space, such that a rope gap for receiving an end of a belt-shaped rope is formed between each wedge member and the upright plate, which rope gap is narrowable by wedging of the wedge member in the wedge shaped space. With this construction one or more of the above mentioned objectives can be achieved. Particularly, several belt-shaped ropes can thus be lifted by gently yet firmly clamping them. The tool is simple to manufacture as well as use.

In a preferred embodiment, the wedge shaped space as well as the wedge members are downwardly tapered and each wedge member is placed in the space such that it has opposite each other a front side face for contacting a rope, which front side face faces the upright plate and is parallel with the upright plate, as well as a back side face, which back side face faces the inclined plate and is parallel with the inclined plate.

In a preferred embodiment, each rope gap is delimited by a vertical planar face of the wedge member and a vertical planar face of the upright plate or alternatively a vertical planar face of a liner attached on the vertical planar face of the upright plate. The gap is thereby delimited by two opposing planar faces. These faces are straight, whereby rope clamped by them will not be bent.

In a preferred embodiment, said guides are arranged to position the rope lifting tool in an upright position when the rope lifting tool is mounted to take support from vertical guide rails. The upright plate is aligned to extend along a vertical plane when the rope lifting tool is in its upright position. The vertical attitude of the plate contributes for supporting the rope end such that it extends in vertical direction without bending it in any way.

In a preferred embodiment, the gap for receiving an end of a belt-shaped rope is substantially larger in width direction of the rope lifting tool than in thickness direction of the rope lifting tool.

In a preferred embodiment, the gap for receiving an end of a belt-shaped rope is at least substantially rectangular.

In a preferred embodiment, the wedge members are movable separately from each other in the wedge shaped space.

In a preferred embodiment, the inclined plate is mounted on the upright plate.

In a preferred embodiment, the guides are mounted on the upright plate.

In a preferred embodiment, the upright plate comprises a suspending means for suspending the rope lifting tool, such as an aperture for receiving a lifting hook.

In a preferred embodiment, the wedge members are movable in the wedge shaped space in first direction (downwards) such that the rope gap is narrowed and in second direction (upwards) such that the rope gap is widened.

In a preferred embodiment, the wedge shaped space is downwardly tapered and the wedge members are movable in the wedge shaped space between a lower position and an upper position, whereby the gap is narrower when the wedge members are in the lower position than in the upper position, and the rope lifting tool comprises a holding means for holding the wedge members in said upper position. Thereby, the holding means can hold the wedge member in a position where the gap is wide, thus enabling easy installation of the rope in the gap. Preferably, the rope lifting tool comprises separate holding means for each of the wedge members, the wedge members thereby being separately holdable in the upper position. Preferably, said holding means comprises a releasable plunger having a head movable into and out from a recess formed in the wedge member. The plunger is preferably be spring loaded.

In a preferred embodiment, each wedge member has a handle for manual movement thereof inside the space. The handle is preferably on top of the wedge member. The handle preferably comprises an eye through which a finger can be inserted.

In a preferred embodiment, the a first guide and the second guide are on opposite sides of the upright plate in width direction of the rope lifting tool.

In a preferred embodiment, the rope lifting tool comprises a fixing means for fixing the upright plate and the inclined plate immovably relative to each other. The fixing means are preferably releasable for enabling detachment of the plates from each other. Preferably, the rope lifting tool comprises an intermediate member placed between said plates to position these relative to each other.

In a preferred embodiment, the rope lifting tool comprises a limit means for limiting the vertical range of movement of the wedge members. Thereby the wedge members cannot fall down in the hoistway. The limit means may comprise a guide bolt fixed on each wedge member and an elongated aperture provided on the inclined plate for each bolt through which the guide bolt extends.

In a preferred embodiment, the rope lifting tool comprises a limit member between wedge members next to each other for limiting the range of movement of them in width direction of the rope lifting tool.

In a preferred embodiment, the upright plate and/or the inclined plate is a plate of uniform material thickness. The material of said plates is preferably metal.

It is also brought forward a new rope lifting arrangement comprising a rope lifting tool as described somewhere above and/or elsewhere in the application. The rope lifting arrangement comprises a plurality of ropes each having an end placed in a rope gap of said rope lifting tool and clamped immovably therein by wedging of a wedge member.

In a preferred embodiment, the arrangement further comprises a hoist arranged to lift the lifting tool.

In a preferred embodiment, the ropes are ropes of an elevator.

In a preferred embodiment, the a rope lifting tool is installed in a hoistway of an elevator, the first guide being arranged to lean against a first guide rail mounted in the hoistway, and the second guide to lean against a second guide rail mounted in the hoistway.

In a preferred embodiment, the upright plate is aligned to extend along a vertical plane.

In a preferred embodiment, said plurality of wedge members includes at least six wedge members.

In a preferred embodiment, the end of each rope is clamped immovably in the gap without bending it such that it extends in vertical direction.

Preferably, said rope comprises one or more load bearing members, which are embedded in a polymer coating forming the surface of the rope, the load bearing members extending parallel to the longitudinal direction of the rope unbroken throughout the length of the rope.

Preferably, the width/thickness ratio of the rope is more than two, preferably more than 4. Thereby the rope attitude in the gap is easily controllable and the pressure exerted thereon is distributed on vast area. Thereby, the rope is also belt well suitable for elevators e.g. due to controllability of its attitude during its passing along diverting wheels.

Preferably, the rope has two wide opposite sides facing in thickness direction of the rope, one to face towards the vertical plate and the other towards the wedge member.

Preferably, said one or more load bearing members is/are made of composite material comprising reinforcing fibers in polymer matrix, said reinforcing fibers preferably being carbon fibers. Composite material of this kind is typically fragile and rigid in all directions. The rope lifting tool as presented is gentle and does not require bending of the rope end, whereby it can clamp effectively this kind of ropes. Preferably, the reinforcing fibers of each load bearing member are substantially evenly distributed in the polymer matrix of the load bearing member in question.

Preferably, said guides are sliding members elongated in the direction of the guide rail.

In a preferred embodiment, said plurality of wedge members includes at least six wedge members and said plurality of ropes includes at least six ropes. With the rope lifting tool a great number of ropes can be lifted. Particularly, this is feasible when the ropes are of light-weighted structure such as comprising load bearing members comprising said composite material.

The aforementioned elevator is preferably an elevator for transporting passengers and/or goods. For this purpose, the elevator is provided with or is to be provided with a car that has an interior space suitable for receiving a passenger or passengers and/or load to be lifted. The elevator is preferably then such that the car thereof is arranged to serve two or more landings. The elevator preferably controls movement of the car in response to calls from landing and/or destination commands from inside the car so as to serve persons on the landing(s) and/or inside the elevator car.

BRIEF DESCRIPTION OF THE DRAWINGS

In the following, the present invention will be described in more detail by way of example and with reference to the attached drawings, in which

FIG. 3a illustrates the rope lifting tool as viewed from above.

FIG. 3b illustrates an enlarged part of FIG. 3a.

FIG. 4 illustrates a cross-section A-A of FIG. 2.

FIG. 5 illustrates a cross-section B-B of FIG. 2.

The foregoing aspects, features and advantages of the invention will be apparent from the drawings and the detailed description related thereto.

DETAILED DESCRIPTION

Figure 1:
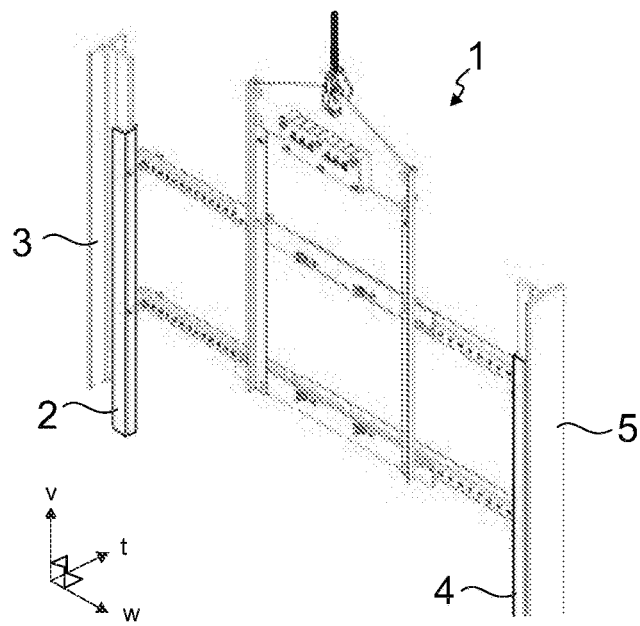
FIG. 1 illustrates an embodiment of a rope lifting tool in upright position.
Figure 2:
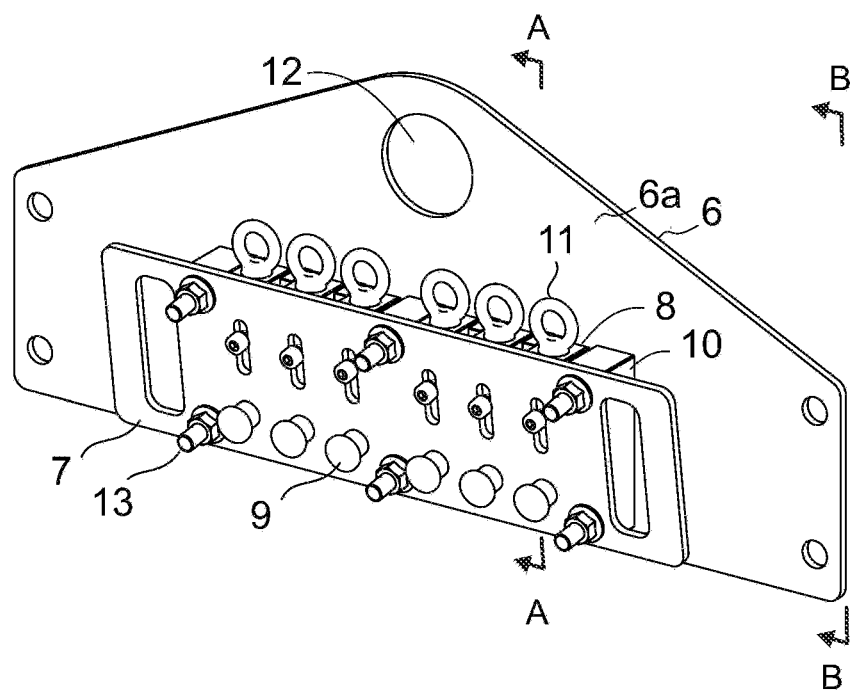
FIG. 2 illustrates preferred details of the rope lifting tool of FIG. 1.

FIG. 1 illustrates an embodiment of a rope lifting tool 1 for belt-shaped ropes mounted to take lateral support from vertical guide rails 3, 5 mounted immovably in a hoistway of an elevator. FIGS. 2 to 5 disclose details of the rope lifting tool 1. The rope lifting tool 1 comprises a first guide 2 for guiding the rope lifting tool 1 along a first guide rail 3 and a second guide 4 for guiding the rope lifting tool 1 along a second guide rail 5. The rope lifting tool 1 further comprises an upright plate 6, as well as an inclined plate 7, which is apart from the upright plate 6 and at an acute angle relative to the upright plate 6. The inclined plate 7 is mounted on the upright plate 6. The upright plate 6 and the inclined plate 7 are positioned such that they have a wedge shaped space S between them. Said guides 2,4 are arranged to position the rope lifting tool 1 in upright position when the rope lifting tool 1 is mounted to take lateral support from vertical guide rails 3,5 by said guides 2,4. When the rope lifting tool 1 is in its upright position, as illustrated, the upright plate 6 is aligned to extend along a vertical plane. The rope lifting tool 1 being provided with said guides 2,4, the correct attitude thereof can be ensured during movement of the tool 1. For example, tilting of the tool 1 can be avoided. Due to the upright plate 6 being vertical, it extends parallel with the ropes R to be lifted with the lifting tool 1 which ropes R hang vertically from the rope lifting tool 1 when being lifted. The vertical attitude of the plate 6 contributes for supporting the rope end such that it extends in vertical direction v without bending it in any way. As a result, the rope lifting tool 1 is well suitable also for lifting ropes that cannot be bent sharply. The upright plate 6 has a vertical planar face 6a forming the face against which the ropes R are to be supported. The rope lifting tool 1 further comprises a plurality of wedge shaped members 8 (later referred to as wedge members) placed inside the wedge-shaped space S adjacent each other in width direction of the rope lifting tool 1. Accordingly, the same wedge-shaped space S is utilized for accommodating several adjacent wedge members 8. A rope gap g for receiving an end of a belt-shaped rope R is formed between each wedge member 8 and the upright plate 6, which rope gap g is narrowable by wedging of the wedge member 8 in the wedge shaped space S so that the rope R installed in the gap g is clamped. Thereby, in each rope gap g a rope R can be installed and clamped between the wedge member 8 and a vertical face 6a. The wedge members 8 are separate members and movable separately from each other in the wedge shaped space S. Thereby, ropes can be clamped and subsequently released independently of each other.

The narrowing of the gap g is provided for in the presented embodiment such that the wedge shaped space S as well as the wedge members 8 are downwardly tapered, as viewed when the tool 1 is in its upright position, and the wedge members 8 are vertically movable in the space S. Moreover, each wedge member 8 is placed in the space S such that it has opposite each other a front side face 8a for contacting a rope R, which front side face 8a faces the upright plate 6, in particular the planar face 6a thereof, and is parallel with the planar face 6a of the upright plate 6 (i.e. vertically), and a back side face 8b, which faces the inclined plate 7 and is parallel with the inclined plate 7, in particular with the inclined face 7a thereof. The back side faces 8b of the wedge members 8 are arranged to be supported against the inclined face 7a of the inclined plate 7.

The rope lifting tool 1 is made suitable for belt-shaped ropes, i.e. for ropes having width substantially larger than thickness, by configuring each said gap g substantially larger in width direction of the rope lifting tool 1 than in thickness direction of the rope lifting tool 1. Each said gap is also configured to be at least substantially rectangular whereby it can receive a rope having at least substantially rectangular cross-section.

The narrowing of the gap g is provided for in the presented embodiment more particularly such that the wedge members 8 are movable in the wedge shaped space S in first direction (downwards) such that the rope gap g is narrowed and in second direction (upwards) such that the rope gap g is widened. Thus, the clamping effect can be obtained by moving the wedge members 8 in the first direction and the released by moving the wedge members 8 in the second direction.

In the presented embodiment, the wedge shaped space S is downwardly tapered as viewed when the rope lifting tool 1 is in its upright position. The wedge members 8 are movable in the wedge shaped space S between a lower position L and an upper position U, whereby the gap g is narrower when the wedge members 8 are in the lower position than in the upper position. For facilitating installation inside the gap g and/or for facilitating removal of the ropes from the gap g, the rope lifting tool 1 comprises a holding means 9 for holding the wedge members 8 in said upper position. Thereby, the holding means 9 are configured for holding the wedge member 8 in a position where the gap is wide. Thus, the rope R can be placed in the gap g without simultaneously handling manually the wedge members 8. The holding means are more specifically such that the rope lifting tool 1 comprises separate holding means for each of the wedge members 8, the wedge members 8 then being separately holdable in the upper position. The holding means are preferably designed to comprise a releasable plunger having a head movable into and out from a recess formed in the wedge member 8. In this case, it is preferable that the plunger is spring-loaded to urge the head movable into said recess.

For enabling easy lifting of the rope lifting tool 1 the lifting tool 1, in particular the upright plate 6 thereof, comprises a suspending means 12 for suspending the rope lifting tool 1, such as an aperture for receiving a lifting hook 15.

For facilitating manual actuation of the wedge members 8, each wedge member 8 has a handle 11 for manual movement thereof inside the space S. The handle 11 is positioned on top of each wedge member 8 whereby it is easily accessible at the wider side of the wedge shaped space S. In the embodiment illustrated, the handle 11 comprises an eye through which a finger can be inserted. The handle is in this case implemented such that the handle is an eye bolt fixed on the wedge member 8.

The rope lifting tool further comprises a limit means 16a,16b for limiting the range of vertical movement of the wedge member 8, at least in the downwardly direction. The wedge members 8 are thus kept from falling down in the hoistway. In the embodiment presented, the limit means 16a,16b comprises a guide bolt 16a fixed on each wedge member 8 and an elongated aperture 16b provided on the inclined plate 7 through which the guide bolt extends. The upper and lower edges of the aperture 16b form a stop face for the bolt 16a and thereby block further movement of the corresponding wedge member 8.

The rope lifting tool 1 further comprises a limit members 17 between wedge members 8 next to each other for limiting the range of movement of them in width direction w of the rope lifting tool 1. The limit members also delimit the gaps g in width direction w of the rope lifting tool 1 thereby limiting the range of movement of the rope R in the gap g in width direction w of the rope lifting tool 1.

The rope lifting tool 1 further comprises a fixing means 10,13 for fixing the plates 6,7 immovably relative to each other. Said means are preferably releasable for enabling detachment of the plates 6,7 from each other. Said means 10,13 comprise an intermediate member 10 placed between the plates 6,7 to position these relative to each other. Said means 10,13 further comprise a tightening means 13 for tightening the plates 6,7 against the intermediate member 10 placed between them.

Referring to the essence of the rope lifting tool 1 in general, the lifting tool 1 has a height as measured in vertical direction v, width as measured in width direction w and thickness as measured in thickness direction t, each at a 90 degrees angle relative to each other. The upright plate 6 extends in vertical direction v when the tool 1 is in its upright position, and said rope gap g is narrowable in thickness direction t of the rope lifting tool 1. The guides 2,4 are preferably configured such that the first guide 2 and the second guide 4 are on opposite sides of the upright plate 6 in width direction w of the rope lifting tool 1, as illustrated. Thus, the rope lifting tool 1 can be guided such that the rope supporting members i.e. the upright plate 6, and an inclined plate 7, and the wedge members have a guide rail on each of its two sides, whereby the lifting is well guided and controlled.

Figure 6:
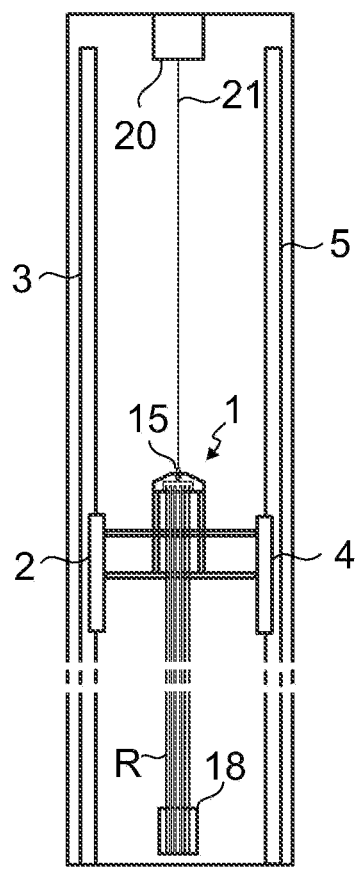
FIG. 6 illustrates a rope lifting arrangement implementing the rope lifting tool of FIG. 1.
Figure 7:
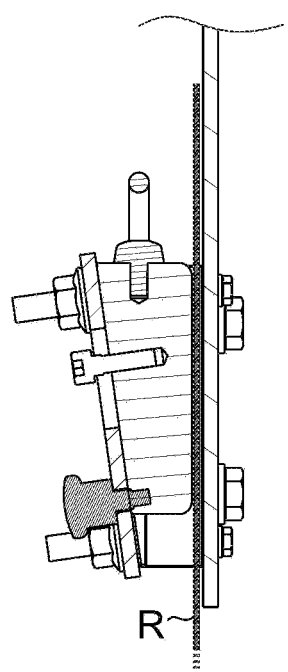
FIG. 7 illustrates a cross-section of the rope lifting tool when ropes have been installed therein.

FIG. 6 illustrates a rope lifting arrangement utilizing the rope lifting tool 1 above described. The rope lifting arrangement comprises the rope lifting tool 1 as described, and a plurality of ropes R each having an end placed in a rope gap g of said rope lifting tool 1 and clamped immovably therein by wedging of the wedging member 8. The rope lifting tool 1 is in its upright position whereby the upright plate 6 is aligned to extend along a vertical plane. FIG. 7 illustrates a cross section of the rope lifting tool 1 at the point of a gap g when a rope R is installed therein.

The rope lifting tool 1 is installed in a hoistway H of an elevator. It is mounted to take lateral support from vertical guide rails 3,5 by its guides 2,4. In particular, the first guide 2 is arranged to lean against a first guide rail 3 mounted immovably in the hoistway H, and the second guide 4 to lean against a second guide rail 5 mounted immovably in the hoistway H. The rope lifting arrangement further comprises a hoist 20 arranged to lift the lifting tool 1. The hoist 20 is mounted stationary and is arranged to move a rope, chain or equivalent flexible member 21 connected with the rope lifting tool 1. The flexible member 21 is connected with a suspending means 12 of the rope lifting tool 1, such as an aperture 15, with a lifting hook 15. The arrangement further comprises one or more rope reels 18 wherefrom the ropes R are unreeled while the rope ends are immovably wedged the rope lifting tool 1 lifts. The suspending means 12 are higher than the wedge members 8, when the rope lifting tool is viewed in its upright position, whereby the lifting force for lifting of the tool 1 are above the level on which the ropes R are clamped. Thus, the tendency of the tool 1 for tilting is reduced.

The rope lifting tool 1 is particularly advantageous when the ropes R are sensitive for bending and/or for local mechanical compression such as compression caused when fixing by screws would be done. Great local mechanical forces are likely to damage the rope when the rope has non-metallic coating and/or fragile load bearing members. The presented rope lifting tool 1 provides a reliable clamping with even force distribution without necessity to bend the ropes R. Accordingly, it solves aforementioned problems of sensitive ropes R. The ropes are preferably such that each rope R comprises one or more load bearing members embedded in polymer coating and extending parallel to the longitudinal direction of the rope unbroken throughout the length of the rope. Preferably, said one or more load bearing members is/are made of composite material comprising reinforcing fibers embedded in polymer matrix, said reinforcing fibers preferably being carbon fibers which have excellent properties for being used in elevator ropes. The ropes are preferably more specifically as disclosed in international patent application WO2009090299A1.

In the preferred embodiment illustrated, the upright plate 6 has a vertical planar face 6a forming the face against which the ropes R are to be directly supported, but alternatively said face 6a could serve as a support face for liner(s) attached thereto, in which case the liner(s) would have vertical planar face(s) parallel with face 6a against which the ropes R are to be supported. Likewise, in the preferred embodiment illustrated the back side faces 8b of the wedge members 8 are arranged to be supported directly against the inclined face 7a of the inclined plate 7, but alternatively the inclined face 7a could serve as a support face for liner(s) attached thereto, in which case the liner(s) would have inclined face(s) parallel with face 7a against which the wedge members 8 would be supported.

As mentioned, in the preferred embodiment, the gap g is delimited by two opposing planar faces. These faces are straight in vertical direction v as viewed when the rope lifting tool 1 is in upright position, whereby rope clamped by them will not be bent. These planar faces may be smooth as illustrated, but this is not necessary as alternatively one or both of them may be roughened, such as provided with knurling. Alternatively, one or both of the planar faces can be provided with some other uneven pattern, such as a polyvee pattern forming a counterpart for the surface of the rope, particularly in case the rope is provided with polyvee pattern. Should the rope be provided with polyvee pattern on one of its sides then it is preferable that the counterpart shape is provided for the planar face formed by the wedge member. Thus, machining or contoured liner need not be provided for the upright plate 6, which would be more laborious.

The guides 2,4 can be sliding members elongated in the direction of the guide rail, for example, as illustrated. Thereby, they can have a long support face or several support points distributed along the length of the guide rail. Thereby, they can effectively resist tilting caused by weight of the ropes R. The guides could alternatively be of some other construction, for example designed to have one or several rollers instead of sliding members.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A rope lifting tool for belt-shaped ropes comprising:
   a first guide for guiding the rope lifting tool along a first guide rail;
   a second guide for guiding the rope lifting tool along a second guide rail;
   an upright plate extending in a vertical direction and including a front surface and a back surface;
   an inclined plate including a front surface and a back surface, wherein an entirety of the inclined plate is at an acute angle relative to the upright plate, the upright plate and the inclined plate having a wedge shaped space between them and the front surface of the upright plate overlaps the entirety of the inclined plate and extends beyond the inclined plate in the vertical direction and in a horizontal direction, the horizontal direction being perpendicular to the vertical direction;
   a plurality of wedge members placed adjacent each other inside the wedge-shaped space and in contact with the back surface of the inclined plate and the front surface of the upright plate; and
   a plurality of guide bolts,
   wherein each guide bolt extends only through a respective elongated aperture of the inclined plate into a respective wedge member, each elongated aperture has a substantially oblong shape, and each guide bolt is movable along a length of the respective elongated aperture to alter a vertical position of the respective wedge member, wherein the back surface of the inclined plate faces the front surface of the upright plate, wherein the plurality of wedge members are spaced apart in the horizontal direction, wherein a rope gap for receiving an end of a belt-shaped rope is formed directly between each wedge member and the upright plate, which rope gap is narrowable by wedging of the wedge member in the wedge shaped space, wherein the first and second guides are configured to slide along the first and second guide rails, respectively, to provide lateral support for the rope lifting tool, wherein the entirety of the first and second guides are spaced from the upright plate and from the inclined plate, and wherein each of the upright plate and the inclined plate are substantially planar.

2. The rope lifting tool according to claim 1, wherein the wedge shaped space and the wedge members are downwardly tapered, and each wedge member is placed in the wedge-shaped space such that each wedge member has opposite each other a front side face for contacting a rope, which front side face faces the upright plate and is parallel with the upright plate, and a back side face, which faces the inclined plate and is parallel with the inclined plate.

3. A rope lifting tool according to claim 2, wherein the gap for receiving an end of a belt-shaped rope is substantially larger in a width direction of the rope lifting tool than in a thickness direction of the rope lifting tool.

4. The rope lifting tool according to claim 1, wherein the rope gap for receiving an end of a belt-shaped rope is substantially larger in a width direction of the rope lifting tool than in a thickness direction of the rope lifting tool.

5. The rope lifting tool according to claim 1, wherein the rope gap for receiving an end of a belt-shaped rope is at least substantially rectangular.

6. The rope lifting tool according to claim 1, wherein the wedge members are movable separately from each other in the wedge shaped space.

7. The rope lifting tool according to claim 1, wherein the inclined plate is mounted on the upright plate.

8. The rope lifting tool according to claim 1, wherein the upright plate comprises a suspending mechanism configured to suspend the rope lifting tool.

9. The rope lifting tool according to claim 8, wherein the suspending mechanism configured to suspend the rope lifting tool is an aperture for receiving a lifting hook.

10. The rope lifting tool according to claim 1, wherein the wedge members are movable in the wedge shaped space in a first downward direction such that the rope gap is narrowed and in a second upward direction such that the rope gap is widened.

11. The rope lifting tool according to claim 1, wherein the wedge shaped space is downwardly tapered and the wedge members are movable in the wedge shaped space between a lower position and an upper position, whereby the rope gap is narrower when the wedge members are in the lower position than in the upper position, and the rope lifting tool comprises a holder configured to hold the wedge members in said upper position.

12. The rope lifting tool according to claim 1, wherein the rope lifting tool comprises a limit member between wedge members next to each other for limiting the range of movement of wedge members next to each other in the horizontal direction.

13. A rope lifting arrangement comprising:
   the rope lifting tool as defined in claim 1; and
   a plurality of ropes, each having an end placed in the rope gap of said rope lifting tool and clamped immovably therein by wedging of the wedge members.

14. The rope lifting arrangement according to claim 13, wherein the arrangement further comprises a hoist arranged to lift the lifting tool.

15. The rope lifting tool according claim 1, wherein each wedge member is provided with a handle positioned on a top thereof for manual movement within the wedge-shaped space.

16. The rope lifting tool according claim 1, wherein the upright plate is configured to extend parallel to a vertical plane of an elevator hoistway.

17. The rope lifting tool according to claim 1, further comprising a plurality of holding fasteners, each holding fastening extending only through a respective aperture of the inclined plate and into a respective wedge member to vertically fix the respective wedge member within the wedge-shaped space.

18. The rope lifting tool according to claim 1, wherein the upright plate has a substantially uniform thickness, and
   wherein the inclined plate has a substantially uniform thickness.

* * * * *